(12) United States Patent
Chen et al.

(10) Patent No.: US 10,310,512 B2
(45) Date of Patent: Jun. 4, 2019

(54) PATH PLANNING METHOD FOR MOBILE ROBOTS

(71) Applicant: ZHEJIANG GUOZI ROBOT TECHNOLOGY CO., LTD., Hangzhou, Zhejiang (CN)

(72) Inventors: Kai Chen, Zhejiang (CN); Yikun Tao, Zhejiang (CN); Xinfeng Du, Zhejiang (CN); Jizhong Shen, Zhejiang (CN); Lingfen Zhu, Zhejiang (CN); Hongbo Zheng, Zhejiang (CN); Xia Wang, Zhejiang (CN); Xudong Mi, Zhejiang (CN)

(73) Assignee: ZHEJIANG GUOZI ROBOT TECHNOLOGY CO., LTD., Hangzhou, Zhejiang (CN)

( * ) Notice: Subject to any disclaimer, the term of this patent is extended or adjusted under 35 U.S.C. 154(b) by 226 days.

(21) Appl. No.: 15/305,507

(22) PCT Filed: Oct. 8, 2016

(86) PCT No.: PCT/CN2016/101511
§ 371 (c)(1),
(2) Date: Oct. 20, 2016

(87) PCT Pub. No.: WO2018/064819
PCT Pub. Date: Apr. 12, 2018

(65) Prior Publication Data
US 2018/0210458 A1    Jul. 26, 2018

(51) Int. Cl.
*G05D 1/00* (2006.01)
*G01C 1/00* (2006.01)
(Continued)

(52) U.S. Cl.
CPC ........... *G05D 1/0287* (2013.01); *G01C 21/20* (2013.01); *G05D 1/0088* (2013.01); *G05D 1/02* (2013.01); *G05D 1/0274* (2013.01); *Y10S 901/01* (2013.01)

(58) Field of Classification Search
CPC ........ G01C 21/00; G01C 21/26; G01C 21/34; G05D 1/00; G05D 1/0287; G05D 1/0088;
(Continued)

(56) References Cited

U.S. PATENT DOCUMENTS 9,511,799 B2 * 12/2016 Lavoie ............... B62D 15/0275
2018/0039282 A1 * 2/2018 Gupta ................ G05D 1/0234

FOREIGN PATENT DOCUMENTS

CN         101837591 A      9/2010
CN         102207736 A      10/2011
(Continued)

*Primary Examiner* — Yonel Beaulieu
(74) *Attorney, Agent, or Firm* — Greer, Burns & Crain, Ltd.

(57) ABSTRACT

A path planning method is provided for mobile robots, including the following steps: Step 1. Searching for available paths according to the destinations of moving of the robots and the nodes properties on the map; Step 2. Determining the optimum path, according to the weights of the segments on all the available paths, with the segments being arbitrary curves made up of Bezier curves or splined curves of a plurality of control points; and Step 3. Driving the robots to move along the optimum path, and to stop at the stop points. The present path planning method for mobile robots increases the ways of connection between the nodes significantly and avoids that there is only a single way of connection between two nodes.

4 Claims, 2 Drawing Sheets

(51) Int. Cl.
*G05D 1/02* (2006.01)
*G01C 21/20* (2006.01)
*G01C 21/26* (2006.01)
*G01C 21/36* (2006.01)

(58) Field of Classification Search
CPC .......... G05D 1/02; G05D 1/0274; B66F 9/00; B66F 9/063; Y01S 901/01
See application file for complete search history.

(56) References Cited

FOREIGN PATENT DOCUMENTS

| | | | |
|---|---|---|---|
| CN | 103376118 A | 10/2013 | |
| CN | 103802113 A | 5/2014 | |
| CN | 104833374 A | 8/2015 | |
| CN | 106382944 A | 2/2017 | |

\* cited by examiner

PATH PLANNING METHOD FOR MOBILE ROBOTS

BACKGROUND

The present invention relates to the field of mobile robots, in particular, to a path planning method for mobile robots.

The current mobile robots carry out the path planning and configure corresponding paths mostly based on the existing maps. In cooperation with the map-based positioning systems, the mobile robots are made to move along the corresponding paths, and stop at the positions of the destination points on the specified path finally.

A path is comprised of nodes and lines, connection of any two nodes can form a line, and connection of multiple lines can build up a map. At present, most mobile robots on one point of the map search for a path to reach another point on the map. But this kind of path planning makes the stop points for the robots need to be situated at the nodes, which is not flexible enough.

SUMMARY

In order to solve the foregoing problems, the present invention provides a path planning method for mobile robots, including the following steps:

Step 1. Searching for available paths according to the destinations of moving of the robots and the nodes properties on the map;

Step 2. Determining the optimum path, according to the weights of the segments on all the available paths, with the segments being arbitrary curves made up of Bezier curves or splined curves of a plurality of control points;

Step 3. Driving the robots to move along the optimum path, and stop at the stop points.

Furthermore, in Step 1, the node properties include rotatable properties and unrotatable properties, the robots can rotate in situ at the nodes with the rotatable properties, thereby switching the segments and searching for available paths.

Furthermore, in Step 2, the weights of the segments are equal to the lengths of the segments, taking the available path with the shortest length of the segment as the optimum path.

Moreover, in Step 2, the weights of the segments may be determined through manual inputs, taking the available path with the smallest weight of the segment as the optimum path.

Furthermore, in Step 3, the stop points are determined through the relative positions on the segments, thereby making the robots stop at arbitrary positions of the segments.

The advantageous effects of the present invention are as follows:

1. The path planning and configuring method for mobile robots of the present invention increases the ways of connection between the nodes significantly and avoids that there is only a single way of connection between the two nodes, by increasing the rotatable properties of the nodes.

2. By increasing the weight properties of the segments, the path planning and configuring method for mobile robots can determine the shortest path quickly, according to the lengths of the segments, and according to the needs, it only needs to regulate the weights of the segments to adjust the move path of the robots, of which the operation is simple.

3. The path planning and configuring method for mobile robots can make the robots stop at arbitrary positions of the segments, without the need for increasing the number of the nodes, thereby not affecting the configuration of the segments of the paths on the map.

DETAILED DESCRIPTION

The present invention will be explained in greater detail herein in conjunction with the accompanying drawings and the specific embodiments.

As shown in FIGS. 1-5, the present invention discloses a path planning method for mobile robots, including the following steps:

Step 1. Searching for available paths according to the destinations of moving of the robots and the nodes properties on the map;

Step 2. Determining the optimum path, according to the weights of the segments on all the available paths, with the segments being arbitrary curves made up of Bezier curves or splined curves of a plurality of control points;

Step 3. Driving the robots to move along the optimum path, and stop at the stop points.

In Step 1, the node properties include rotatable properties and unrotatable properties, the robots can rotate in situ at the nodes with the rotatable properties, thereby switching the segments and searching for available paths.

At a node, if the angle of the adjacent segments exceeds a certain degree (configurable), and if no properties that permit rotating are configured at the node, it is believed that this segment is not connectable, and this segment will not be connected in path searching, on the contrary, if properties that permit rotating are configured at the node, this segment will be connected, and the mobile robot will switch the segment in a way of rotating in situ while it moves to that node.

Figure 1:
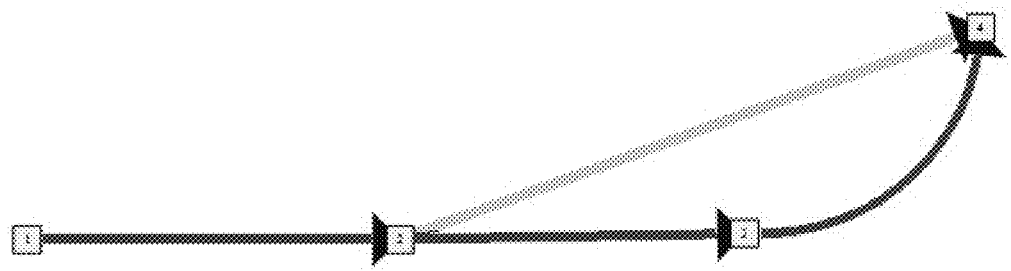
FIG. 1 is the optimum path from node 1 to node 4 of the present invention when no properties that permit rotating in situ are configured at node 2.
Figure 6:
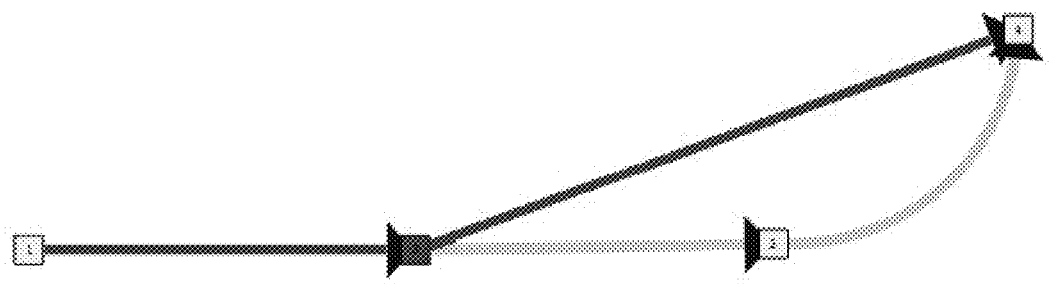
FIG. 6 is the optimum path from node 1 to node 4 of the present invention when properties that permit rotating in situ are configured at node 2.

As illustrated in FIG. 1, in an embodiment, when no properties that permit rotating in situ are configured at node 2, since segment (1,2) and segment (2,4) have an angularity mutation at node 2, it is believed that segment (1,2) and segment (2,4) are disconnected in path searching, and the path searched out practically is (1,2)→(2,3)→(3,4) instead of the shortest path (1,2)→(2,4). In an embodiment, as illustrated in FIG. 6, when properties that permit rotating in situ are configured at node 2, the path searched out will be the shortest path (1,2)→(2,4).

In an embodiment, the segments have weight configuring properties. In Step 2, the weights of the segments are equal to the lengths of the segments, taking the available path with the shortest length of the segment as the optimum path. The weights of the segments may be determined through manual inputs, taking the available path with the smallest weight of the segment as the optimum path.

The weight is equal to the length of the segment by default, but modifying the weight will not affect the length of the segment. The default path search is the shortest path search, but for some paths that satisfy the path conditions simultaneously, if it is needed that the robots go along the longer path, at this point, it may be achieved by modifying the weight of the corresponding path.

Figure 2:
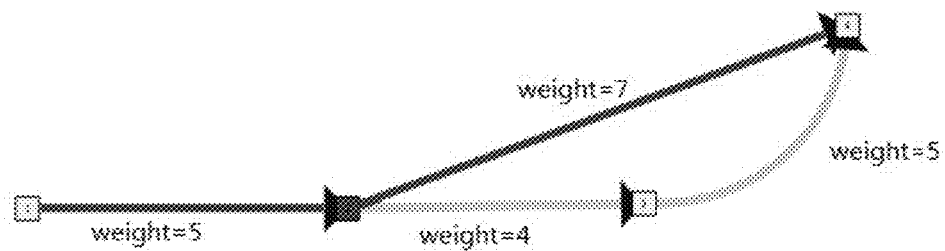
FIG. 2 is the optimum path from node 1 to node 4 of the present invention when the default weight of each segment is the length of the segment.
Figure 7:
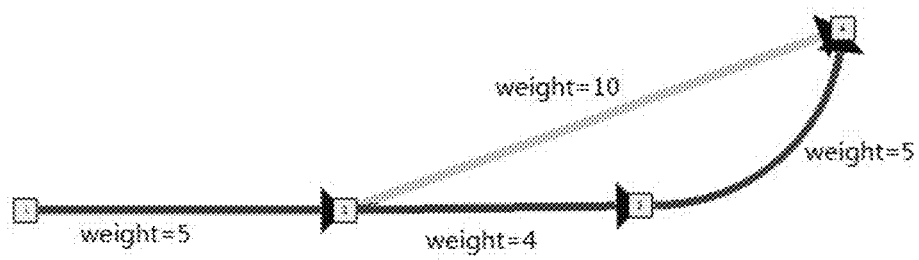
FIG. 7 is the optimum path from node 1 to node 4 of the present invention when the weight of segment (2,4) is changed to 10.

In an embodiment, the default weight of each segment is the length of the segment, as shown in FIG. 2. When the path planning needed for the robot is (1,2)→(2,3)→(3,4) instead of the shortest (1,2)→(2,4), at this point, it can be achieved by modifying the weight of the path. For example, changing the weight of segment (2,4) to 10 as shown in FIG. 7, or changing the sum of the weights of segment (2,3) and segment (3,4) to a value smaller than 7 would cause the path finally searched out to be (1,2)→(2,3)→(3,4).

In Step 3, the stop points are determined by the relative positions on the segments, thereby making the robots stop at arbitrary positions of the segments.

Figure 3:
FIG. 3 is a schematic diagram of the initial path with no stop points configured of the present invention.
Figure 4:
FIG. 4 is a schematic diagram of the path with nodes being taken as stop points of the present invention.

As shown in FIGS. 3-4, for the majority of mobile robots at present, the destination points of stopping are on the nodes of the path, if it needs to set up a great number of destination points of stopping densely on a certain segment, it requires setting up a great number of path nodes. In addition, in order to increase stop points on an existing path, it requires increasing corresponding nodes, and in this way, the overall map path is altered.

Figure 5:
FIG. 5 is a schematic diagram of stop points being situated at arbitrary positions of the segment of the present invention.

As shown in FIG. 5, therefore, in an embodiment of the present invention, an arbitrary point on the segment is represented in terms of the relative position (the percentage of the distance from the starting point of the segment out of the overall length of the segment on corresponding segment) of the stop point in a certain segment, in this way, setting of the stop points does not need to alter the existing map paths, and it can also alter the positions of the stop points conveniently without affecting the existing path, and in the meanwhile, the operation of additions, deletions and modifications of the stop points will not affect the path searching of other stop points (the paths searched out for other stop points remain unchanged).

The foregoing is not intended to limit the invention, any subtle modifications, equivalent replacements and improvements made to the above embodiments according to the technical substance of the present invention should be included in the protection scope of the technical solution of the present invention.

The invention claimed is:

1. A path planning method for mobile robots, wherein the method comprises the following steps:
   (1) searching for available paths according to the destinations of moving of the robots and the nodes properties on a map;
   (2) determining the optimum path, according to the weights of the segments on all the available paths, with the segments being arbitrary curves made up of Bezier curves or splined curves of a plurality of control points; and
   (3) driving the robots to move along the optimum path, and to stop at the stop points,
   wherein in step (1), the node properties comprise rotatable properties and unrotatable properties, the mobile robots are configured to rotate in situ at the nodes with the rotatable properties, thereby switching the segments and searching for available paths, wherein at a node, if the angle of the adjacent segments exceed a certain degree (configurable), and if no properties that permit rotating are configured at the node, the segments are not connectable, and the segments will not be connected in path searching, and alternatively, if properties that permit rotating are configured at the node, the segments are connected, and the mobile robot will switch the segments in a way of rotating in situ while the mobile robot moves to that node.

2. The path planning method for mobile robots according to claim 1, wherein in step (2), the weights of the segments are equal to the lengths of the segments, taking the available path with the shortest length of the segment as the optimum path.

3. The path planning method for mobile robots according to claim 1, wherein in step (2), the weights of the segments are determined through manual inputs, taking the available path with the smallest weight of the segment as the optimum path.

4. The path planning method for mobile robots according to claim 1, wherein in step (3), the stop points are determined through the relative positions on the segments, thereby making the robots stop at arbitrary positions of the segments.

* * * * *